United States Patent [19]

Burgdorf et al.

[11] 4,252,141
[45] Feb. 24, 1981

[54] FLOW CONTROL VALVE

[75] Inventors: Jochen Burgdorf, Offenbach; Lüdwig BEML/u/ decker, Frankfurt am Main; Klaus Winter, Schwalbach; Anton David, Goetzenhain, all of Fed. Rep. of Germany

[73] Assignee: ITT Industries, Inc., New York, N.Y.

[21] Appl. No.: 147,432

[22] Filed: May 5, 1980

Related U.S. Application Data

[63] Continuation of Ser. No. 859,612, Dec. 12, 1977, abandoned.

[30] Foreign Application Priority Data

Jan. 3, 1977 [DE] Fed. Rep. of Germany ....... 2700058

[51] Int. Cl.³ .......................................... G05D 11/00
[52] U.S. Cl. ............................... 137/101; 137/514.5; 60/418
[58] Field of Search ................. 137/117, 514.5, 514.7, 137/101, 115, 118; 60/413, 418

[56] References Cited

U.S. PATENT DOCUMENTS

| 502,252 | 7/1893 | Hanna | 137/514.5 |
|---|---|---|---|
| 515,578 | 2/1894 | Eynon | 137/514.7 |
| 533,953 | 2/1895 | Holly | 137/514.7 |
| 3,680,587 | 8/1972 | Herscovici | 137/514.5 |
| 4,016,895 | 4/1977 | Budecker | 137/101 |
| 4,051,864 | 10/1977 | Iwatsuki | 137/514.5 |
| 4,084,604 | 4/1978 | Budecker et al. | 137/115 |
| 4,130,127 | 12/1978 | Budecker et al. | 137/115 |

FOREIGN PATENT DOCUMENTS 2364413 7/1975 Fed. Rep. of Germany .

*Primary Examiner*—Martin P. Schwadron
*Assistant Examiner*—H. Jay Spiegel
*Attorney, Agent, or Firm*—John T. O'Halloran; Alfred C. Hill

[57] ABSTRACT

The valve includes a control piston axially slidable in a cylindrical bore which controls the cross-sectional area of an orifice of a connection between the cylindrical bore communicating with a pressure port and a user port. The control piston is acted on by a spring and a pressure which is reduced relative to the pressure at the pressure port. A cushioning arrangement acting on the control piston avoids occurrence of pressure surges affecting the control piston behavior.

8 Claims, 7 Drawing Figures

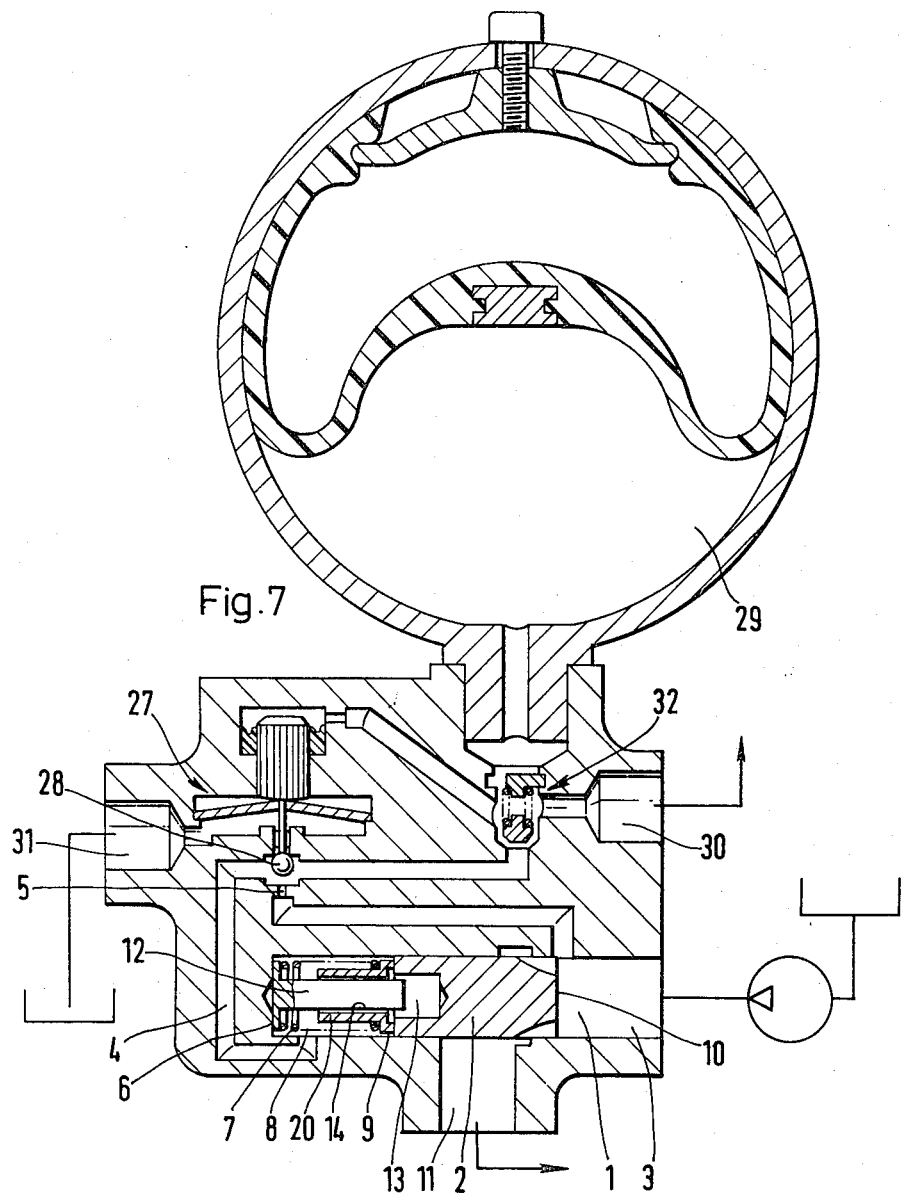

FLOW CONTROL VALVE

This application is a continuation of application Ser. No. 859,612, filed Dec. 12, 1977 now abandoned.

BACKGROUND OF THE INVENTION

A flow-control valve comprising a pressure port and a user port, with a control piston axially slidable in a cylindrical bore and spring-loaded in one direction of movement, the piston being adapted to control the cross-sectional area of an orifice of a connection between the pressure port and the user port, with the control piston having two effective areas acted upon by pressure in mutually opposite directions, with the first effective area being acted upon by the pressure in front of a metering throttle in the pressure and user ports, respectively, and the second effective area being acted upon by the pressure behind the metering throttle.

From the German published patent application DOS No. 2,364,413, an accumulator charging valve is known which includes a flow-control valve. This flow-control valve comprises a control piston axially slidable in a cylindrical bore and subdividing the cylindrical bore into two chambers. The one chamber forms at the same time the pressure port connected to a fluid-pressure source and communicates with the second chamber through a metering throttle. Behind the metering throttle, the connection between the pressure port and the second chamber is adapted to communicate with a second user port. Thus the control piston has applied to its front end closest to the first chamber the pressure prevailing in front of the metering throttle, and to its front end closest to the second chamber the pressure prevailing behind the metering throttle. In addition to this, a compression spring arranged in the second chamber and taking support on the bottom of the second chamber bears on the control piston. In the case of an increase in the fluid volume supplied from the fluid source to the pressure port, the differential pressure in front of and behind the metering throttle will increase and, consequently, also the pressures acting on the front ends of the control piston, thereby causing the control piston to be displaced into the second chamber in opposition to the force of the spring. As a result, the cross-sectional area of an orifice from the first chamber to a first user port opening into the cylindrical bore in the area of control piston is opened.

The disadvantage of this flow-control valve is that it responds particularly sensitively to all pressure surges and pulsations of the pressure fluid acting on the control piston, in particular on pressure surges occurring in the pressure port at the time of connection and disconnection of the second user port with and from the pressure port. On the one hand, these pressure surges cause disturbing noise due to the control piston bottoming at the second chamber, on the other hand, they adversely affect the user components linked to the user ports.

SUMMARY OF THE INVENTION

Therefore, it is the object of this invention to provide a flow-control valve which avoids the occurrence of such pressure surges in the user port. According to this invention, this object is achieved by providing for axial displacement of the control piston in opposition to the resistance of a cushioning arrangement. This cushioning arrangement avoids too fast reversals of the direction of travel of the control piston. Further, the cushioning arrangement avoids vibrations of the control piston which may occur under certain operating conditions as a result of the spring mass system.

In an advantageous embodiment of this invention, the cushioning arrangement consists of a plunger piston which is arranged at an effective area of the control piston and, respectively, at an end surface of the cylindrical bore in an axial relationship thereto and is slidable in a cushion cavity formed in the end surface and, respectively, the effective area, with the cushion cavity communicating, via a throttle, with the pressure chamber of the cylindrical bore which pressure chamber is defined by the effective area and the end surface. In this arrangement, the throttle is advantageously formed by the space between the envelope surface of the plunger piston and the cylindrical wall of the cushion cavity. This design is insensitive to contamination because the space, owing to its axial length, may be relatively large. The large space permits also straight-forward and inexpensive manufacture of the plunger piston and the cushion cavity because these two parts need not be manufactured to high tolerances and require no special surface finish.

In an embodiment constructed in accordance with this invention, the plunger piston is disposed at the control piston and extends into the bore, which forms the cushion cavity, of a sleeve taking support with one end on the end surface of the cylindrical bore.

In another advantageous embodiment of this invention, the plunger piston is a sleeve resting with one end against the end surface of the cylindrical bore and extending into an axial cushion cavity formed in the control piston. In these two embodiments, the use of a sleeve affords the advantage of not necessitating high manufacturing tolerances for the nesting components. In these two embodiments, the sleeve is advantageously kept in abutment with the end surface of the cylindrical bore by a spring bearing against the control piston. This spring has the advantage of being able to perform two functions at a time, namely to apply a resilient load on the control piston in one direction of travel, while at the same time keeping the sleeve in abutment with the end surface of the cylindrical bore.

In still another advantageous embodiment of this invention, the plunger piston disposed at the end surface of the cylindrical bore extends into the cushion cavity of a sleeve resting with one end against the effective area of the control piston. In this arrangement, the sleeve is advantageously kept in abutment with the effective area of the control piston by means of a spring bearing against the end surface of the cylindrical bore. This embodiment affords likewise the advantages of low manufacturing tolerances and dual function of the spring as described in the preceding embodiments.

In order to improve the cushioning effect, the envelope surface of the plunger piston may be provided with one or several radial circumferential grooves.

In order to limit the cushioning effect, it will be an advantage if the cushion cavity is adapted to communicate with the pressure chamber via a pressure-relief valve. The provision of such a valve makes the cushioning arrangement of the flow-control valve independent of viscosity and, consequently, of temperature. This pressure-relief valve may be so designed that the sleeve has a pressure area connected with the cushion cavity and adapted to be acted upon against the force of the spring so that, as the pressure in the cushion cavity increases against the spring force and exceeds a predetermined magnitude, it will be lifted off from its contact surface, thereby providing a direct connection between the cushion cavity and the pressure chamber. In this sleeve design, the spring has, in addition to the two functions described in the above, a third function which is to serve as a control spring for the pressure-relief valve.

According to one possibility to design the sleeve as a pressure-relief valve, the pressure area is formed by a step-like widening at the end of the sleeve abutting the end surface of the cylindrical bore and the effective area of the control piston, respectively. In another advantageous embodiment, the pressure area is the front end of the sleeve which end rests against the end surface of the cylindrical bore and the effective area of the control piston, respectively.

In a particularly advantageous embodiment, the flow-control valve whose control piston is spring-loaded in the closing direction includes a reversing valve which is disposed in the connection from the pressure port to the second effective area behind the metering throttle and has a first valve position in which the second effective area and a second user port are connected to the pressure port, and a second valve position in which the second effective area and the second user port are connected to a return port. In this arrangement, a check valve may be disposed in the second user port and the reversing valve may be adapted to change its position in dependance on the pressure in the second user port behind the check valve. This design has the advantage of avoiding the occurrence of pressure heads at the time of valve position change from the first to the second user port and vice versa. Such pressure heads are particularly disadvantageous if the flow-control valve is fitted to a vehicle and the first user port communicates with the steering system. Pressure surges during steering which communicate themselves to the steering wheel may be a hazard to safety.

BRIEF DESCRIPTION OF THE DRAWING

Above-mentioned and other features and objects of this invention will become more apparent by reference to the following description taken in conjunction with the accompanying drawing, in which:

FIG. 7 is a cross sectional view of an accumulator charging valve incorporating a flow-control valve constructed in accordance with the principles of the present invention.

DESCRIPTION OF THE PREFERRED EMBODIMENTS

Figure 1:
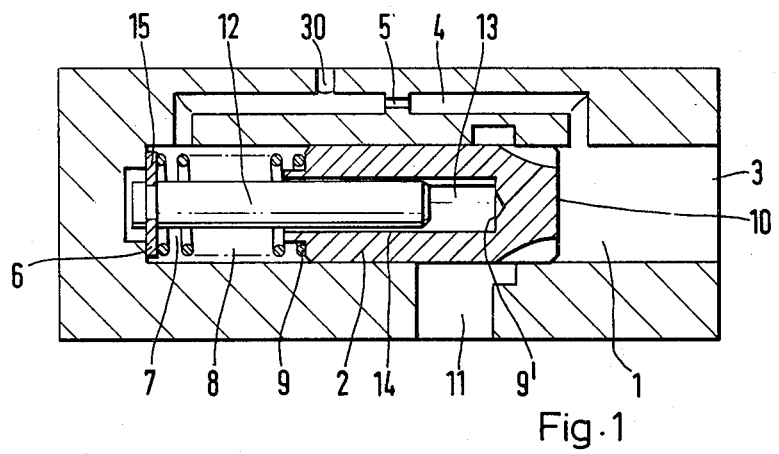
FIG. 1 is a longitudinal cross sectional view of a flow-control valve constructed in accordance with the principles of the present invention.

The various embodiments of the flow-control valves include a cylindrical bore 1 accommodating an axially slidable control piston 2. The right-hand end of cylindrical bore 1 is at the same time the pressure port 3. From pressure port 3, a connection 4 accommodating a metering throttle 5 leads to a pressure chamber 7 formed between control piston 2 and end surface 6 of cylindrical bore 1. From connection 4, a second user port 30 branches off behind metering throttle 5. Pressure chamber 7 houses a spring 8 which takes support upon end surface 6 and bears against the side of effective area 9 of control piston 2 facing pressure chamber 7. The first effective area 10 of control piston 2 facing pressure port 3 is exposed to the pressure at pressure port 3, while the second effective area 9 has applied to it a pressure which is reduced by metering throttle 5. In the normal position, control piston 2 shuts off a first user port 11 opening into cylindrical bore 1. With the pressure differential between pressure port 3 and pressure chamber 7 increasing, control piston 2 will be displaced to the left, and the cross-sectional area of an orifice from pressure port 3 to user port 11 will open.

Disposed in pressure chamber 7 is a cushioning arrangement which dampens the axial movements of control piston 2, i.e., vibrations are absorbed and fast reversals of the direction of travel are avoided.

In the flow-control valve of FIG. 1, the cushioning arrangement consists of a plunger piston 12 resting with one end against the end surface 6 while its other end extends into a cushion cavity 13 formed axially in control piston 2, without this cavity being designed as a through bore. The space or clearance 14 between the outer surface of plunger piston 12 and the inner surface of cushion cavity 13 forms a throttle. At its end close to end surface 6, plunger piston 12 has a washer 15 inserted into a groove on plunger piston 12, via which washer plunger piston 12 is held against end surface 6 by spring 8. With its other end, spring 8 bears against the second effective area 9 of control piston 2. The bottom of cushion cavity 13 forms an effective area 9' adapted to be acted upon by the pressure behind metering throttle 5. Due to the space 14 acting as a throttle, the pressure acting on effective area 9' is only slowly allowed to propagate from chamber 7 into cushion cavity 13.

Figure 2:
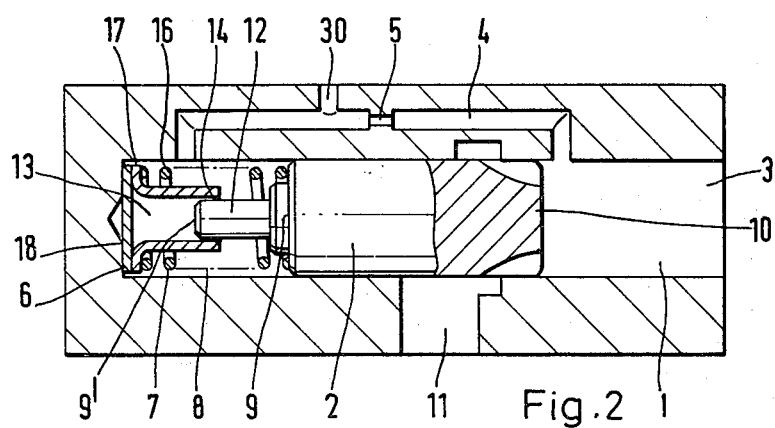
FIG. 2 is a longitudinal cross sectional view of a second embodiment of a flow-control valve constructed in accordance with the principles of the present invention.

In FIG. 2, plunger piston 12 is disposed with one end at control piston 2 and projects with its other end into a sleeve 16 bearing against the end surface 6, with the central bore of sleeve 16 forming cushion cavity 13. The end surface of plunger piston 12 projecting into sleeve 16 forms an effective area 9' which corresponds to the effective area 9' of FIG. 1. At its end facing end surface 6, sleeve 16 widens radially outwardly, resting with its widened end 17 against end surface 6 through an elastic washer 18. Elastic washer 18 serves as a seal and for the compensation of manufacturing tolerances. Spring 8 bearing against control piston 2 rests against widened end 17, keeping sleeve 16 in abutment with end surface 6. The space 14 between the envelope surface of plunger piston 12 and the cylindrical wall of cushion cavity 13 forms a throttle.

Figure 3:
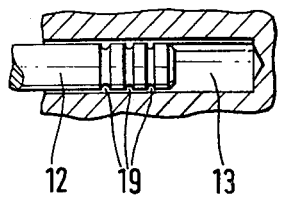
FIG. 3 is a fragmentary view, in section, of an alternative plunger piston that may be disposed in the cushion cavity of the embodiments of FIGS. 1, 2, 4 and 5 in accordance with the principles of the present invention.

The plunger piston 12 illustrated in FIG. 3 and that may be disposed in the cushion cavity 13 of the embodiments of FIGS. 1, 2, 4 and 5 is provided with several radial circumferential grooves 19 which serve to increase the cushioning effect.

Figure 4:
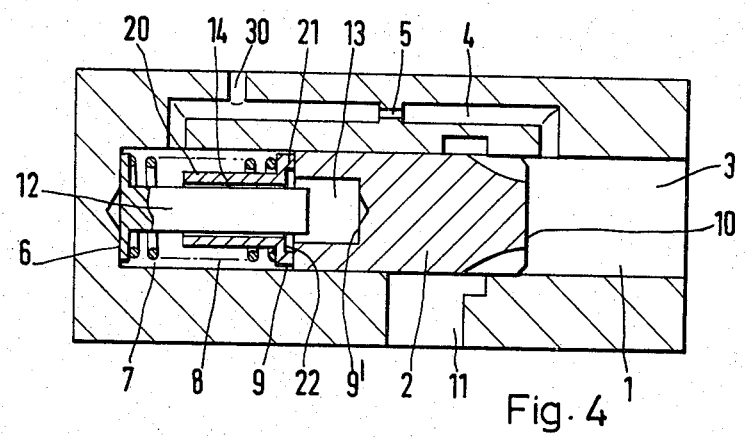
FIG. 4 is a longitudinal cross sectional view of a third embodiment of a flow-control valve constructed in accordance with the principles of the present invention.

The flow-control valve illustrated in FIG. 4 includes, similar to the valve illustrated in FIG. 1, a plunger piston 12 one end of which is held in abutment with end surface 6 by spring 8, while its other end extends into the bore of a sleeve 20 resting against the second effective area 9 of control piston 2, the bore of sleeve 20 serving as the cushion cavity 13. The end of control piston 2 facing the cushion cavity 13 forms the effective area 9'. At its end resting against control piston 2, sleeve 20 has a step-like widening 21 against which spring 8 bears on the one side, thereby keeping sleeve 20 in abutment with control piston 2. On the other side, the step-like widening 21 forms a pressure area 22 which is adapted to be acted upon against the spring force and communicates with cushion cavity 13. If the pressure in cushion cavity 13 exceeds a predetermined magnitude, sleeve 20 will be lifted off from control piston 2, thereby providing a direct communication between cushion cavity 13 and pressure chamber 7 which by-passes the throttle formed between plunger piston 12 and cushion cavity 13 by space 14.

Figure 5:
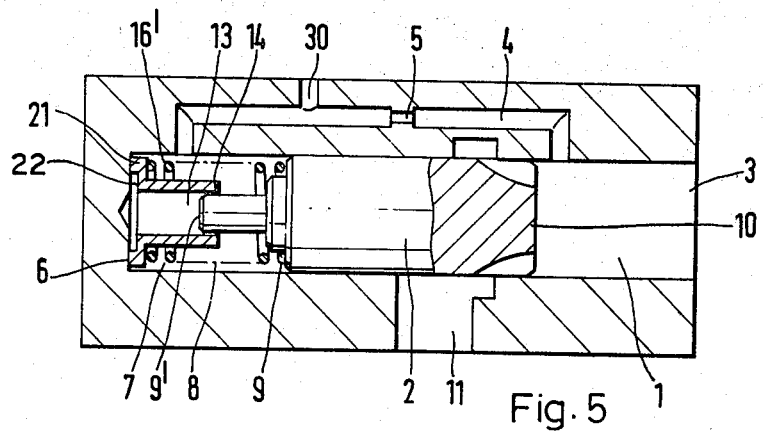
FIG. 5 is a longitudinal cross sectional view of a fourth embodiment of a flow-control valve constructed in accordance with the principles of the present invention.

The flow-control valve of FIG. 5 corresponds substantially to the flow-control valve of FIG. 2. The only difference is the part of sleeve 16' resting against end surface 6. In this area, sleeve 16' includes, similar to FIG. 4, a step-like widening 21 against which spring 8 bears on the one side, spring 8 keeping sleeve 16' in abutment with end surface 6, while the step-like widening 21 forms on its other side a pressure area 22 communicating with cushion cavity 13 and having the same function as the pressure area 22 of FIG. 4. In the flow-control valve of FIG. 5, the space 14 between plunger piston 12 and cushion cavity 13 also forms a throttle.

Figure 6:
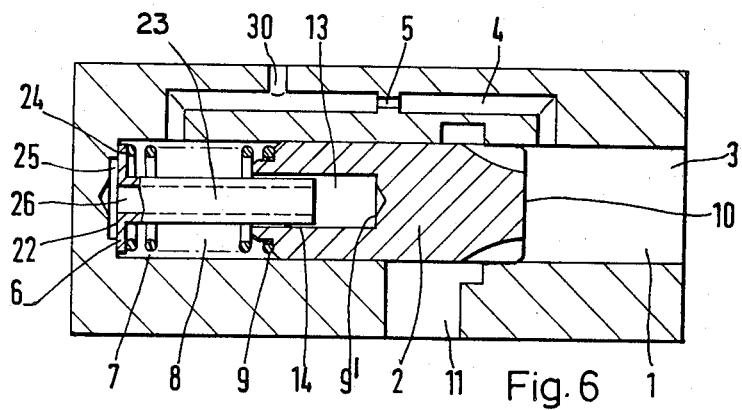
FIG. 6 is a longitudinal cross sectional view of a fifth embodiment of a flow-control valve constructed in accordance with the principles of the present invention.

In FIG. 6, the plunger piston is a sleeve 23 resting with one end against end surface 6 and extending into a cushion cavity 13 formed in control piston 2. The bottom of cushion cavity 13 forms the effective area 9'. At its end resting against end surface 6, sleeve 23 is provided with a radial widening 24 the diameter of which is larger than the diameter of a recess 25 coaxially formed in end surface 6. The diameter of recess 25 is, however, larger than the diameter of sleeve 23, thereby providing at the end of sleeve 23 facing end surface 6 a pressure area 22 which, as a result of the connection between cushion cavity 13 and recess 25 via bore 26 of sleeve 23 and similar to FIGS. 4 and 5, is exposed to the pressure in cushion cavity 13 against the force of spring 8 which keeps sleeve 23 in abutment with end surface 6. When the pressure in cushion cavity 13 exceeds a predetermined magnitude, this arrangement enables sleeve 23 to be lifted off from end surface 6 and permits by-passing of the throttle formed by the space 14 between sleeve 23 and cushion cavity 13.

The mode of operation of the flow-control valves illustrated in the various figures is the same for each valve. Pressure fluid passes from a pressure-fluid source to pressure port 3. The pressure then prevailing at pressure port 3 propagates, in dependence on the fluid decrease at the second user port 30, reduced by metering throttle 5, to pressure chamber 7 via connection 4, so that the two effective areas 9 and 10 of control piston 2 are exposed to different pressures. In addition, spring 8 acts on control piston 2 in the closing direction. In accordance with the pressure differential on either side of control piston 2, control piston 2 will be displaced, thereby opening or closing a cross-sectional area of an orifice between pressure port 3 and user port 11. However, this movement cannot be fast because it is cushioned by the cushioning arrangement. In this movement, plunger piston 12 is displaced in cushion cavity 13, thereby urging pressure fluid out of, or into, cushion cavity 13 through space 14 serving as a throttle, depending on the direction of travel of plunger piston 12.

In addition to this, the embodiments of FIGS. 4 to 6 are provided with a pressure-relief valve which is formed by the pressure areas 22 at sleeves 16', 20 and 23. Namely, if the pressure in cushion cavity 13 exceeds a magnitude predetermined by spring 8, sleeves 16', 20 and 23 will be lifted off from the contact surface, the end surface 6 and the second effective area 9, respectively, so that the throttle formed by space 14 is by-passed by the direct connection between cushion cavity 13 and pressure chamber 7. This arrangement makes the flow-control valve independent of temperature and viscosity.

FIG. 7 shows an accumulator charging valve incorporating a flow-control valve constructed in accordance with this invention in which a reversing valve 27 is disposed in the connection 4 between pressure port 3 and pressure chamber 7 behind metering throttle 5. Reversing valve 27 includes a closure member 28 providing, in a first valve position, for communication from pressure port 3 to pressure chamber 7, a second user port 30 and, via a check valve 32, a pressure accumulator 29. In the second valve position, pressure chamber 7 and second user port 30 communicate with a return port 31. Reversing valve 27 changes its position in dependence on the pressure in accumulator 29 so that closure member 28 is in the first valve position when the pressure in accumulator 29 is below a predetermined maximum. If the pressure in accumulator 29 exceeds this maximum, reversing valve 27 will change its position, and closure member 28 will be in its second valve position.

This accumulator charging valve may be advantageously fitted to a vehicle, with the first user port 11 connecting with a steering arrangement and the second user port 30 connecting with a braking system. In this application, the flow-control valve according to the invention is of particular advantage because it reduces the pressure surges occurring in prior-art flow-control valves during valve position changes. This is of particular importance because the pressure surges act also on the steering arrangement and are a hazard to safety especially during a steering operation. In addition, the flow-control valve constructed in accordance with the invention avoids disturbing noise occurring during bottoming.

While we have described above the principles of our invention in connection with specific apparatus it is to be clearly understood that this description is made only by way of example and not as a limitation to the scope of our invention as set forth in the objects thereof and in the accompanying claims.

We claim:

1. A pressure accumulator charging valve comprising:
   a flow-control valve including
   a pressure port,
   a first user port,
   a control piston axially slidable in a cylindrical bore having a closed end surface, said control piston being spring-loaded in one direction of movement and adapted to control the cross-sectional area of an orifice of a connection between said pressure port and said first user port, a cushioning arrangement disposed in said cylindrical bore adjacent said end surface to provide a resistance in opposition to the axial displacement of said control piston, said cushioning arrangement including a sleeve having a step-like widening on one end thereof disposed coaxial of a longitudinal axis of said cylindrical bore with said step-like widening abutting said end surface and the remainder of said sleeve extending toward an adjacent end of said control piston, said step-like widening and said end surface defining a pressure area in communication with a sleeve bore coaxial of said axis and extending through said sleeve providing a cushion cavity, and a plunger piston connected to said adjacent end of said control piston extending into said cushion cavity to provide said resistance, said spring being disposed between said step-like widening and said adjacent end of said control piston to bias said step-like widening into abutment with said end surface;

a reversing valve disposed in a passageway from said pressure port to a pressure chamber disposed in said cylindrical bore between said end surface and said adjacent end of said control piston adjacent said sleeve, said pressure chamber and said reversing valve being disposed beyond a metering throttle in said passageway, said reversing valve having a first valve position in which said pressure chamber is directly connected to said metering throttle, a second user port is connected to said metering throttle by a check valve having fluid flow therethrough from said reversing valve to said second user port and an accumulator is connected for actuation of said reversing valve adjacent said check valve and a second valve position in which said pressure chamber is connected to a return port, said reversing valve being responsive to pressure in said accumulator to change the position thereof; and a pressure-relief valve including said pressure area and said spring to enable said cushion cavity to communicate with said pressure chamber when pressure in said cushion cavity exceeds a predetermined magnitude.

2. A charging valve according to claim 1, wherein the outer surface of said plunger piston is provided with at least one radial circumferential groove.

3. A charging valve according to claim 2, wherein said cushion cavity communicates with said pressure chamber by a second throttle including the space formed between the outer surface of said plunge piston and the inner surface of said sleeve bore.

4. A charging valve according to claim 1, wherein said cushion cavity communicates with said pressure chamber by a second throttle including the space formed between the outer surface of said plunger piston and the inner surface of said sleeve bore.

5. A flow-control valve comprising:

a housing including a longitudinal bore having a closed end surface;

a pressure port connected to said longitudinal bore at an end thereof remote from said end surface;

a first user port extending radially through said housing into said longitudinal bore;

a control piston axially slidable in said longitudinal bore, spring-loaded in one direction of movement and adapted to control the cross-sectional area of an orifice of a connection between said pressure port and said first user port;

a passageway in said housing from said pressure port to a pressure chamber disposed in said longitudinal bore between said end surface and an adjacent end of said control piston, said passageway having therein a metering throttle;

a second user port connected to said passageway between said pressure chamber and said metering throttle;

a cushioning arrangement disposed in said pressure chamber to provide a resistance in opposition to the axial displacement of said control piston, said cushioning arrangement including a sleeve having a step-like widening on one end thereof disposed coaxial of a longitudinal axis of said longitudinal bore in said pressure chamber with said step-like widening abutting said end surface and the remainder of said sleeve extending toward said adjacent end of said control piston, said step-like widening and said end surface defining a pressure area in communication with a sleeve bore coaxial of said axis and extending through said sleeve providing a cushion cavity, a plunger piston connected to said adjacent end of said control piston extending into said cavity to provide said resistance, said spring being disposed between said step-like widening and said adjacent end of said control piston to bias said step-like widening into abutment with said end surface, and a pressure-relief valve including said pressure area and said spring to enable said cushion cavity to communicate with said pressure chamber when pressure in said cushion cavity exceeds a predetermined magnitude.

6. A valve according to claim 5, wherein the outer surface of said plunger piston is provided with at least one radial circumferential groove.

7. A valve according to claim 6, wherein said cushion cavity communicates with said pressure chamber by a second throttle including the space formed between the outer surface of said plunger piston and the inner surface of said sleeve bore.

8. A valve according to claim 5, wherein said cushion cavity communicates with said pressure chamber by a second throttle including the space formed between the outer surface of said plunger piston and the inner surface of said sleeve bore.

* * * * *